US00RE41554E

(19) United States
(12) Reissued Patent
Baker

(10) Patent Number: US RE41,554 E
(45) Date of Reissued Patent: Aug. 24, 2010

(54) COORDINATED LIFT SYSTEM

(75) Inventor: William J. Baker, Shawnee, KS (US)

(73) Assignee: Gray Manufacturing Company, Inc., St. Joseph, MO (US)

(21) Appl. No.: 11/197,724

(22) Filed: Aug. 4, 2005

Related U.S. Patent Documents

Reissue of:
(64) Patent No.: 6,634,461
Issued: Oct. 21, 2003
Appl. No.: 10/166,134
Filed: Jun. 10, 2002

(51) Int. Cl.
*B66B 1/28* (2006.01)
*B66F 7/10* (2006.01)

(52) U.S. Cl. ..... 187/247; 187/210
(58) Field of Classification Search ..... 187/224, 187/226, 227, 233, 249, 250, 247, 210
See application file for complete search history.

(56) References Cited

U.S. PATENT DOCUMENTS 3,757,895 A * 9/1973 Knutson ..... 182/46
4,131,263 A * 12/1978 John
4,141,526 A * 2/1979 John
D252,324 S * 7/1979 John
4,173,268 A * 11/1979 Nussbaum
4,187,927 A * 2/1980 Byrne
4,230,196 A * 10/1980 Snead
4,245,808 A * 1/1981 John
4,334,667 A * 6/1982 Fox
4,573,663 A * 3/1986 Nussbaum (Continued)

FOREIGN PATENT DOCUMENTS

DE 26 49 769 * 5/1978
DE 4242705 * 6/1994
DE 4312771 * 11/1994
DE 4330099 * 3/1995
DE 29615428 * 1/1997

(Continued)

OTHER PUBLICATIONS

The EVJ "Under–The–Hoist" Jack, published by Meyer Hydraulics Corporation, dated 1997.*

Under Hoist Jack for Automotive and HD Truck Use, published by Norco Professional Lifting Equipment, dated Jan. 2000.*

New Developments in Electrical Actuators for Post Brakes and Electrical Devices for Material–Handling Equipment, by N.I. Ivashkov, published in Russian Journal of Heavy Machinery, No. 12, pp. 6–10, dated 1995.*

(Continued)

*Primary Examiner*—Walter Benson
*Assistant Examiner*—Eduardo Colon-Santana
(74) *Attorney, Agent, or Firm*—Polsinelli Shughart PC; Dennis A. Crawford; Marcia J. Rodgers

(57) ABSTRACT

A lift system that coordinates the raising and lowering of a vehicle relative to a surface by using wireless communications is provided. The lift system includes at least two lift mechanisms each having a post, a carriage, an actuating device and a control device. The carriage is slidably coupled to the post and is adapted to support a portion of the vehicle. The actuating device is coupled with the carriage and is capable of moving the carriage relative to the post. The control device is coupled with the actuating device and is capable of communicating by wireless signals with the other control device. The control devices communicate by wireless signals to coordinate the movement of the carriages relative to the posts to raise or lower the vehicle. Further, a rechargeable battery may provide power to the control device to allow for increased mobility of the lift system.

15 Claims, 5 Drawing Sheets

U.S. PATENT DOCUMENTS

| | | | | | |
|---|---|---|---|---|---|
| 4,777,798 | A | | 10/1988 | Jacobson et al. | |
| 5,176,225 | A | * | 1/1993 | Nussbaum | |
| 5,180,131 | A | * | 1/1993 | Few | |
| 5,197,311 | A | * | 3/1993 | Clark | |
| D334,879 | S | * | 4/1993 | Few | |
| 5,205,586 | A | * | 4/1993 | Tallman | |
| 5,284,321 | A | * | 2/1994 | Meyer | |
| D347,955 | S | * | 6/1994 | Leftwich | |
| 5,330,315 | A | * | 7/1994 | Beattie et al. | 414/814 |
| D349,801 | S | * | 8/1994 | Few et al. | |
| D350,055 | S | * | 8/1994 | Few | |
| 5,348,330 | A | * | 9/1994 | Few et al. | |
| 5,410,894 | A | * | 5/1995 | Fox et al. | |
| 5,435,523 | A | * | 7/1995 | Hying et al. | |
| 5,444,199 | A | * | 8/1995 | Burchard et al. | |
| 5,500,691 | A | * | 3/1996 | Martin et al. | 348/734 |
| 5,501,428 | A | * | 3/1996 | Garceau | |
| 5,518,220 | A | * | 5/1996 | Bertrand et al. | |
| 5,575,605 | A | * | 11/1996 | Fisher | 414/490 |
| D376,715 | S | * | 12/1996 | Few | |
| 5,613,418 | A | * | 3/1997 | Guido | |
| 5,638,387 | A | * | 6/1997 | Palleggi et al. | |
| 5,649,422 | A | * | 7/1997 | Baginski et al. | |
| 5,901,980 | A | * | 5/1999 | Few et al. | |
| 5,975,496 | A | * | 11/1999 | Hong et al. | |
| 5,975,497 | A | * | 11/1999 | Few et al. | |
| D431,707 | S | * | 10/2000 | Few | |
| 6,135,422 | A | * | 10/2000 | Thomas | |
| 6,193,219 | B1 | * | 2/2001 | Belley et al. | 254/89 H |
| 6,237,953 | B1 | * | 5/2001 | Farmer | 280/763.1 |
| 6,254,054 | B1 | * | 7/2001 | Few | |
| 6,315,079 | B1 | | 11/2001 | Berends et al. | |
| 6,968,963 | B1 | * | 11/2005 | Zakula et al. | 212/270 |
| 2002/0100901 | A1 | * | 8/2002 | Topelberg et al. | 254/423 |
| 2006/0102432 | A1 | * | 5/2006 | Matsumoto | 187/203 |

FOREIGN PATENT DOCUMENTS

| | | | |
|---|---|---|---|
| DE | 29700687 | * | 3/1997 |
| DE | 19600791 | * | 7/1997 |
| DE | 4401314 | * | 8/1998 |
| DE | 19731345 | * | 1/1999 |
| DE | 299 16 254 U1 | * | 4/2000 |
| DE | 4409550 | * | 8/2000 |
| EP | 0296151 | * | 7/1987 |
| EP | 0263262 A2 | | 4/1988 |
| EP | 0568938 | * | 4/1993 |
| EP | 0669281 | * | 7/1997 |
| EP | 0263262 B1 | | 4/1998 |
| EP | 0893391 | * | 6/1998 |
| EP | 0860395 | * | 8/1998 |
| FR | 2717456 | * | 3/1994 |
| WO | WO 92/19527 | | 11/1992 |
| WO | WO 98/30488 | | 7/1998 |
| WO | WO 98/31183 | | 7/1998 |

OTHER PUBLICATIONS

Microprocessor–Based Control Device for Lifts and Other Transport Systems Plants, published in EDPE '94, Pula, Croatia, pp. 261–264, dated Sep. 12–14, 1994.*

Electric Steering Drives Replace Hydraulic Units, by Phil Kingsley, published in Power Transmission Design, pp. 57–59, dated Aug. 1994.*

Design of a Battery Powered Skid–Steer Loader, by K. Chicoine, et al, published in SAE Technical Paper Series 851516, pp. 1–6, dated Sep. 9–12, 1958.*

Motor–Pumps (Innovations), by R.T. Schneider, published in Hydraulics & Pneumatics, vol. 55, No. 1, dated Jan. 1, 2002.*

Lift Tables (Southworth Products Corp.) (Brief Article), published in American Printer, vol. 225, No. 1, dated Apr. 1, 2000.*

Walk–Behind Floor Crane. (Brief Article), published in IIE Solutions, vol. 32, No. 8, dated Aug. 1, 2000.*

* cited by examiner

COORDINATED LIFT SYSTEM

Matter enclosed in heavy brackets [ ] appears in the original patent but forms no part of this reissue specification; matter printed in italics indicates the additions made by reissue.

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present invention relates to a coordinated lift system. In particular, the present invention relates to a coordinated lift system having at least two lift mechanisms that communicate by wireless signals to coordinate the raising and lowering of a vehicle.

The need to lift a vehicle from the ground for service work is well established. For instance, it is often necessary to lift a vehicle for tire rotation or replacement, steering alignment, oil changes, brake inspections, exhaust work and other automotive maintenance. Traditionally, lifting a vehicle has been accomplished through the user of equipment that is built-in to the service facility. These built-in units are located at a fixed location at the service facility and adapted to contact the vehicle frame to lift the vehicle from the ground. However, built-in units are very expensive and sometimes impractical due to their immobility.

In an effort to increase mobility and reduce the need to invest in permanent lifting equipment, a device commonly known as a mobile column lift (MCL) was developed. A set of MCL's are typically used to independently engage each of the tires and lift the vehicle from the ground. Using a basic form of MCL's to lift a vehicle in a generally level orientation, a user must go back and forth between each MCL to incrementally raise each of the MCL's until the vehicle reaches the desired height or involve several people. While this MCL is less expensive and provides more mobility than the built-in units, using a plurality of MCL's to lift the vehicle is a time consuming and tedious process.

Another method for lifting a vehicle using multiple MCL's is described in U.S. Pat. No. 6,315,079 to Berends et al. The lifting device in Berends includes using a number connecting lines or wires to connect the MCL's to one another. Even through the lines or wires that are connected between the MCL's allow the vehicle to be raised or lowered in a uniform fashion, this device also suffers from a number of drawbacks and deficiencies. For instance, the lines and wires used to connect the MCL's extend across and are looped within the working area. The presence of the wires and lines in the work area poses a hazard to people working near the vehicle. Vehicles also end up driving over these connecting lines causing damage.

Accordingly, there remains a need for a mobile lift system that is able to coordinate the raising or lowering of a vehicle without having to physically connect the lift mechanisms to one another. The present invention fills these needs as well as various other needs.

BRIEF SUMMARY OF THE INVENTION

In order to overcome the above-stated problems and limitations, and to achieve the noted objects, there is provided a lift system that coordinates the raising and lowering of a vehicle relative to a surface through the use of wireless communications.

In general, the lift system includes at least two lift mechanisms, each including a post, a carriage, an actuating device and a control device. The carriage is slidably coupled to the post and is adapted to support a portion of the vehicle. The actuating device is coupled with the carriage and is capable of moving the carriage relative to the post. The control device is coupled with the actuating device and is capable of communicating by wireless signals with another control device. The control devices on each lifting mechanism communicate with each other by wireless signals to coordinate the movement of each carriage relative to the posts to raise of lower the vehicle relative to the surface.

Additionally, the control device may include a transceiver, a sensor, a display and a stop mechanism. The transceiver is capable of transmitting and receiving wireless signals from another control device. The sensor may be positioned externally relative to control device and is used for determining the position of the carriage relative to the post. Further, the stop mechanism operates to prevent movement of the carriage relative to the post. The lift system may also include a rechargeable battery that provides portable power to the control device and actuating device to move the vehicle relative to the surface. Furthermore, the present invention may include a remote control device capable of communicating with the control box using wireless signals to raise or lower the vehicle relative to the surface without being stationed to a particular location.

A method for the coordinated lifting and lower of a vehicle relative to a surface is also provided. The method includes providing for first and second lift mechanisms, placing the first and second lift mechanisms in contact with a portion of the vehicle, sending a wireless signal from the first lift mechanism, receiving the wireless signal at the second lift mechanism wherein wireless signal instructs the second lift mechanism to move the vehicle relative to the surface, and moving the vehicle using the first lift mechanism in coordination with the second lift mechanism.

Further objects, features, and advantages of the present invention over the prior art will become apparent from the detailed description of the drawings which follows, when considered with the attached figures.

BRIEF DESCRIPTION OF THE SEVERAL VIEWS OF THE DRAWINGS

In the accompanying drawings which form a part of the specification and are to be read in conjunction therewith and in which like reference numerals are employed to indicate like parts in the various views.

DETAILED DESCRIPTION OF THE INVENTION

Figure 1:
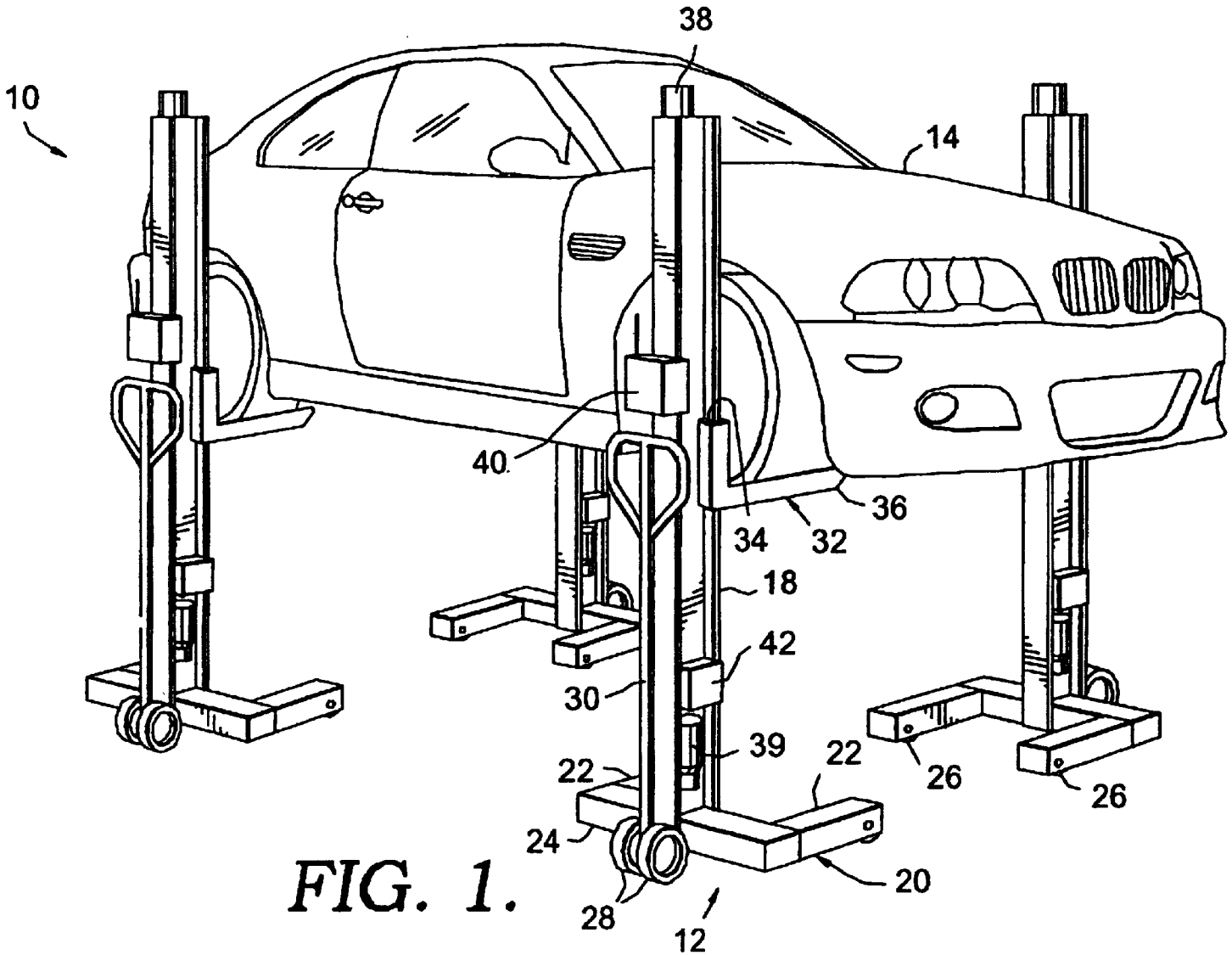
FIG. 1 is a perspective view showing a plurality of lift mechanisms supporting a vehicle in a raised position according to the present invention.

Referring now to the drawings in detail, and initially to FIG. 1, numeral 10 generally designates a lift system constructed in accordance with a first preferred embodiment of the present invention. Generally, lift system 10 includes four lift mechanisms 12 that communicate by wireless signals to coordinate the movement of a vehicle 14 relative to a surface. It will be understood and appreciated that the number of lift mechanisms 12 used in the present invention may vary depending on the type of vehicle being lifted. For instance, six lift mechanisms may be used to lift a three axle vehicle for service. Furthermore, it will be understood that lift system 10 is not limited for use with vehicles, but also may be used to raise or lower other objects relative to the surface.

Each lift mechanism 12 includes an upstanding post 18 supported by a base 20. Base 20 includes a pair of flanges 22 that are coupled to one another by a cross piece 24. A pair of front wheels 26 are rotatably coupled with an end portion of flanges 22. Further, a pair of rear wheels 28 are rotatably coupled adjacent to cross piece 24. Wheels 26, 28 are adapted to allow lift mechanism 12 to be rolled along the surface and placed in a position to support vehicle 14. A handle 30 is coupled to wheels 26, 28 and may be moved about a pivot point established adjacent to wheels 28. Handle 30 may be used to place wheels 26, 28 in contact with the surface so that lift mechanism 12 may be rolled into position. Once lift mechanism 12 is in position, handle 30 may then be used to raise wheels 26, 28 so that they are no longer in contact with the surface. The lift mechanism is thereby placed in a stable position for raising and lowering vehicle 14.

Post 18 is mounted to cross piece 24 and extends upwardly from the surface. Lifting mechanism 12 also includes a carriage 32 that is slidably coupled to post 18. Specifically, carriage 32 includes a slot portion 34 that engages a portion of post 18 to enable carriage 32 to move longitudinally with respect to post 18. Carriage 32 further includes a pair of forks 36 that extend outwardly from slot portion 34 and are adapted to support a portion of vehicle 14. In particular, forks 36 are adapted to support vehicle 14 at each wheel, but it will be understood that carriage 32 may also be adapted to support the frame or any other portion of vehicle 14.

Carriage 32 may be moved relative to post 18 using a piston and cylinder assembly 38. The piston may be secured to post 18 and/or base 20 in a generally upright position. The cylinder is coupled to carriage 32 in such a way that the cylinder and carriage 32 move upwardly or downwardly in conjunction with one another. Generally, a power unit 39 is used to move a fluid into the cylinder in such a manner to cause piston to rise and will be described in further detail below. The movement of the piston causes carriage 32 move upwardly relative to the surface. As fluid is removed from the cylinder, the piston moves downwardly and carriage 32 is lowered through the use of gravity. It will be understood that piston and cylinder assembly 38 may operate to move carriage 32 through the use of either hydraulic or pneumatic forces. Further, it is also within the scope of this invention to use a double acting cylinder to move carriage 32 relative to post 18.

As best seen in FIG. 1, each lift mechanism 12 also includes a control box 40 that is adapted to communicate with the other control boxes in lift system 10 by wireless signals to coordinate the raising and/or lifting of vehicle 14. With additional reference to FIG. 2, a rechargeable battery 42, or other power source, may provide power to control box 40 by selectively activating a power switch 43. An antenna 44 may be coupled to each control box 40 to enhance the quality of the wireless communication between the control boxes. Furthermore, control box 40 may include a transceiver, not shown, that is capable of sending and receiving wireless communications to and from other control boxes in lift system 10.

Control box 40 provides for a number of input components 46. One input component is a height sensing mechanism 48 which is adapted to determine the height of carriage 32 relative to the surface and relay that information back to control box 40. It should be understood that height sensing mechanism 48 may be separate from and positioned in a different location relative to control box 40. Other input components include an emergency stop button 50, an interlock function 52, a selector switch 54 and a motion switch 56. Emergency stop button 50 allows a user to instruct control box 40 to stop moving carriage 32 relative to post 18. Interlock function 52 should be engaged before lifting or lowering of carriage 32 can occur. When lift system 10 is in a synchronized mode, interlock function 52 also allows a user to specify which one of the control boxes will be the master control box. Once a master control box is selected, the remaining control boxes are designated as slave control boxes and operate under instructions provided by the master control box. A more detailed discussion of the coordinated operation of lift mechanism 12 will be provided below. Selector switch 54 allows control box 40 to be changed between independent and synchronized modes, which will also be discussed in more detail below. Motion switch 56 is adapted to instruct control box 40 to raise or lower carriage 32 relative to the surface. The emergency stop, interlock or motion input components 46 described above may be activated by a remote control device 58. Remote control device 58 may communicate with control box 40 to initiate some input devices 46 from a location that is remote from lift mechanism 12. It will be appreciated that it is also within the scope of this invention to provide for other input devices such as, but not limited to, a level sensor that is adapted to determine the position of post 18 relative to a vertical axis.

Control box 40 also provides for output components 59. These output device may include power unit 39, a lowering valve solenoid 62, a holding valve solenoid 64, a safety release solenoid 66. Output components 59 are interconnected between control box 40 and piston and cylinder assembly 38 and power unit 39 and are used to control the movement of carriage 32 relative to post 18. In particular, power unit 39 is used to activate the pump in piston and cylinder assembly 38 to move fluid within the cylinder to raise carriage 32. Lowering valve solenoid 62 may be activated to release fluid from the cylinder thereby allowing gravity lower carriage 32 toward the surface. Holding valve solenoid 64 normally maintains the position of carriage 32 relative to post 18. Safety release solenoid 66 is a backup mechanism that normally functions upon the failure of piston and cylinder assembly 38 to prevent carriage 32 from inadvertently falling downwardly towards the surface. During the lowering operation of lift system 10, either holding valve solenoid 64 or safety release solenoid 66 may be activated to release carriage 32 and allow it to move relative to post 18. Another output device that is coupled with control box 40 is a display 68. Display 68 may be used to convey information such as, but not limited to the height of one or more of the lift mechanisms, the frequency at which the control boxes are communicating with each other, the amount of power in battery 42, whether control box is operating in independent or synchronized mode and whether control boxes have been interlocked with each other.

In operation, one or more lift mechanisms 12 are first placed in a position to support a portion of vehicle 14. In particular, forks 36 are placed on opposite sides of the tire in a support position. In order to provide a mobile and convenient lift system, each of the lift mechanisms 12 may be powered by rechargeable battery 42. Specifically, the energy stored in the battery may provide the power required for the operation of the lift mechanism, including the control box. The battery may be replenished during the operation of lift mechanism 12, or while lift mechanism 12 are not in use.

Figure 2:
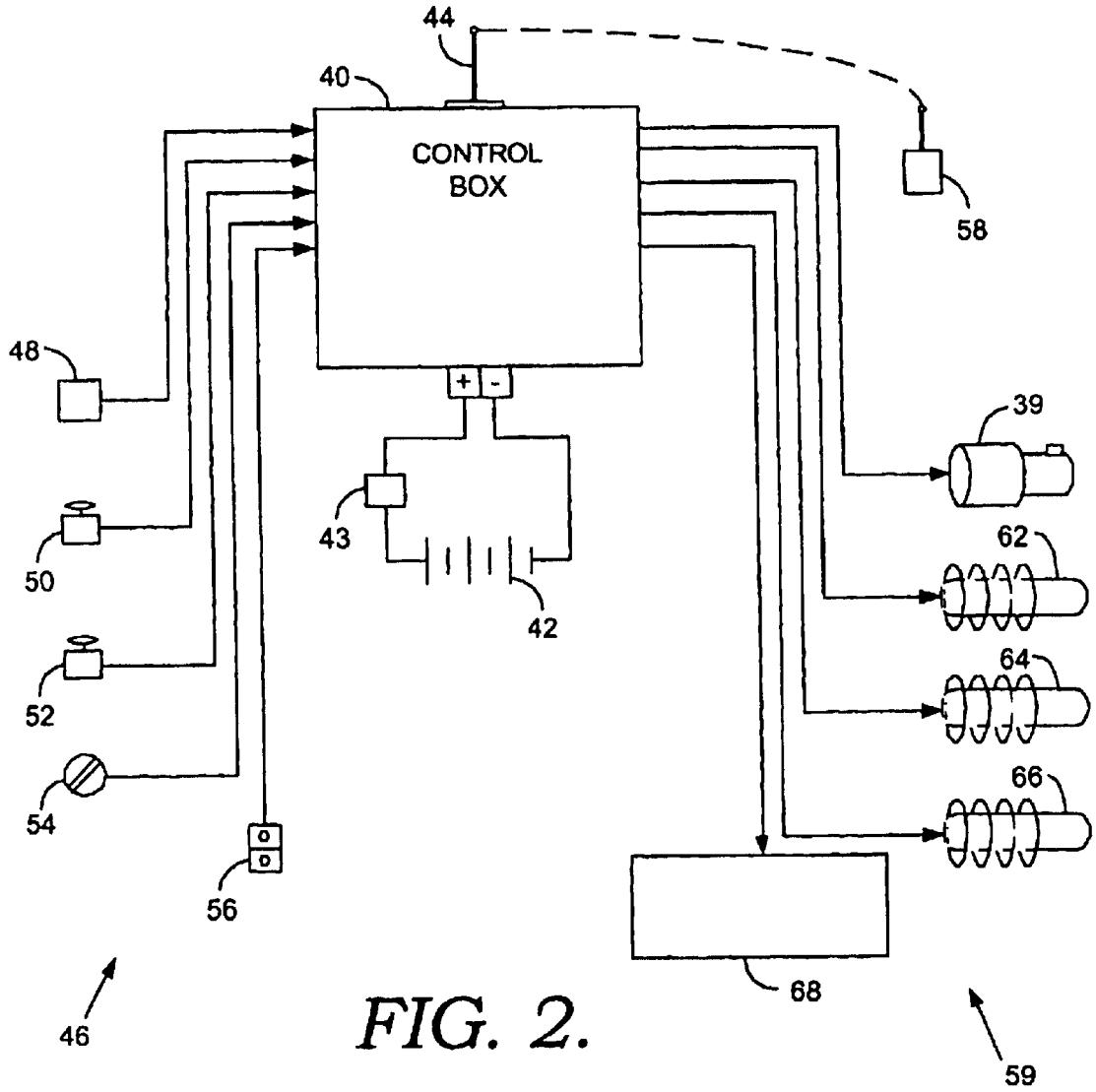
FIG. 2 is a schematic diagram showing the input and output components associated with the control boxes mounted on each of the lift mechanisms.
Figure 3:
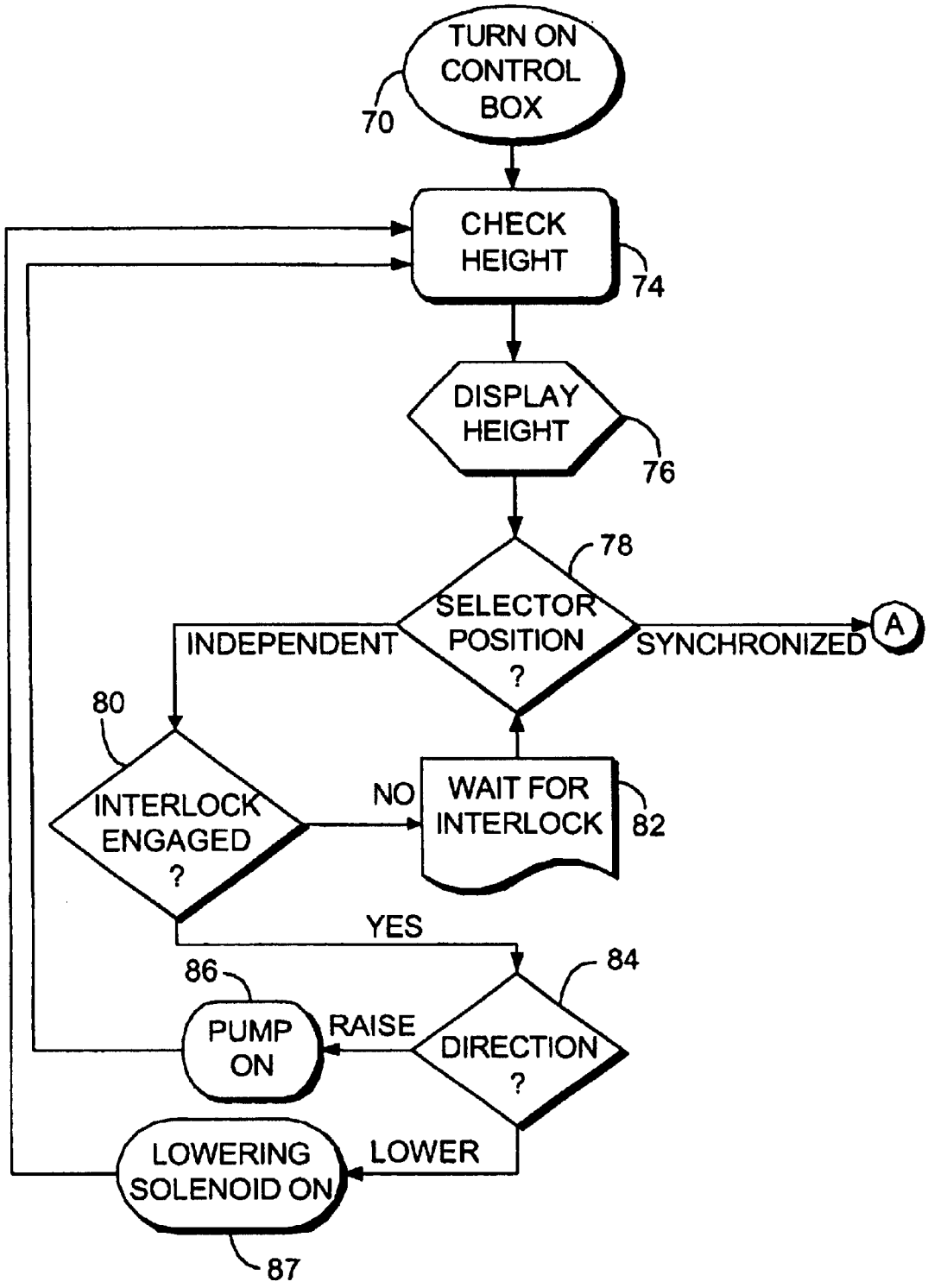
FIG. 3 is a flow chart illustrating the operation of the control box when placed in an independent mode, a portion thereof also applying to the operation of the control box when placed in a synchronized mode.

Each lift mechanism 12 provides for a dual mode of operation, specifically, an independent mode and a synchronized mode. The independent mode allows each lift mechanism to operate independent of one another to raise or lower each of their carriages relative to the surface by inputs received at each of their separate control boxes. The operation of a lift mechanism in an independent mode is best illustrated in FIGS. 2 and 3. The first step 70 is to turn on control box 40. Next, the height sensing mechanism 48 is used to determine the height of carriage 32 relative to the surface at step 74. The height information obtained by height sensing mechanism 48 is transmitted to control box 40 and the provided on display 68 as shown by step 76. The next step 78 is to move selector switch 54 to the independent mode position, if it is not already in such a position. Selector switch may also 54 be moved to a synchronized mode which is depicted by letter A and will be described in further detail below. Once the selector switch 54 is in the independent mode, the next step 80 is for control box 40 to determine whether the interlock function 52 has been engaged. If interlock function 52 is not engaged, then lift mechanism 12 must wait until such function is engaged at step 82, and then return to step 78. Once interlock function 52 is engaged at step 80, the user then has to option to raise or lower the carriage 32 using motion switch 56 at step 84. If the user wants to raise vehicle 14 relative to the surface, control box 40 activates power unit 39 which turns the pump on at step 86 and causes piston and cylinder assembly 38 to move carriage 32 in an upward direction. As carriage 32 raises vehicle 14, the height is monitored by returning to step 74. Once vehicle 14 reaches the desired height operator releases interlock 52 and motion switch 56, the pump turns off, and control box 40 displays the new height. On the other hand, if user wants to lower vehicle 14, control box 40 activates lowering valve solenoid 62, holding valve solenoid 64 and safety release solenoid 66 at step 87 to move carriage 32 in an downward direction. As carriage 32 lowers vehicle 14, the height is monitored by returning to step 74. Once vehicle 14 reaches the desired height, the lowering valve solenoid 62, holding valve solenoid 64 and safety release solenoid 66 are deactivated, and the holding valve and a backup mechanism are ready to maintain the position of carriage 32. The backup mechanism is generally a mechanical device, such as a latch, that releasably engages carriage 32 in order to maintain its position relative to post 18.

Figure 4:
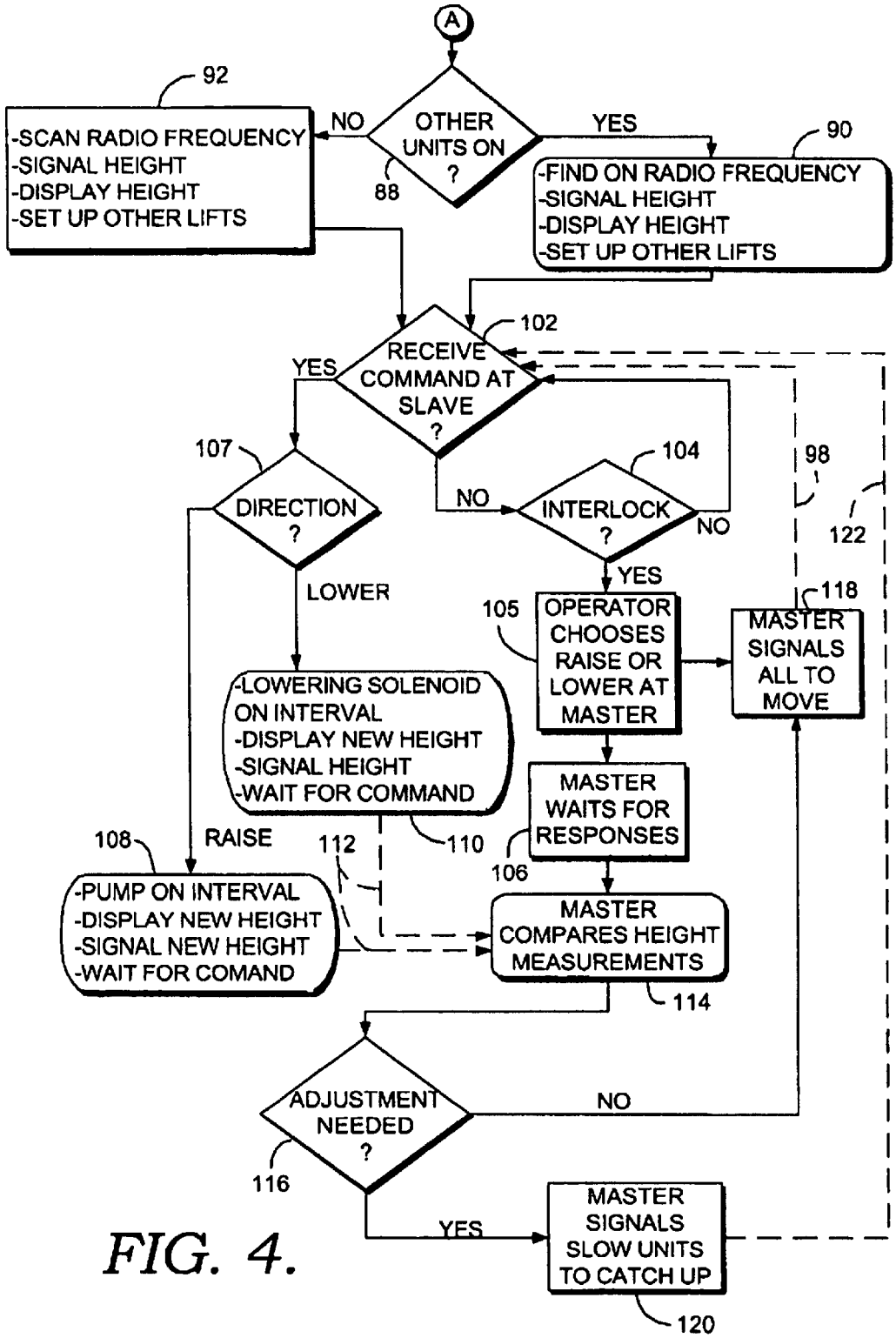
FIG. 4 is a flow chart illustrating a portion of the operation of the control box when placed in the synchronized mode, the wireless communications being shown in dashed lines.

As previously stated, the lift system 10 may also be placed in a synchronized mode. The synchronized mode allows input commands at one control box to influence other control boxes within the system to provide a coordinated lift of vehicle 14. The synchronized mode begins in a similar fashion as in the independent mode. Specifically, as best seen in FIGS. 2 and 3, the control box on one of the lift mechanisms is turned on at step 70 and proceeds to perform steps 74 and 76 as was described in the independent mode. The next step 78 is to move selector switch 54 to the synchronized mode position, if it is not already in such a position. As best seen in FIGS. 2 and 4, once the selector switch 54 is in the synchronized mode, the next step 88 is to determine which of the control boxes 40 will take part in the coordinated lift of vehicle 14. Once all of the participating control boxes are turned on, the lift system moves to step 90 where each of the control boxes are adjusted to the same general radio frequency, each of the height sensing mechanisms 48 provide a height measurement to their respective control boxes, and the control boxes provide the height measurement on the display. Further, any other lift mechanisms that will take part in the lift should also be set up at step 90. On the other hand, if no other control boxes are turned on, then lift mechanism 12 proceeds to step 92 where it scans for a clear radio frequency channel and signals the height. In addition, lift mechanism displays the height as the operator sets up the other participating lift mechanisms in step 92. Once the lift mechanism is placed in synchronized mode, it is searching to communicate with one or more lift mechanisms.

Figure 5:
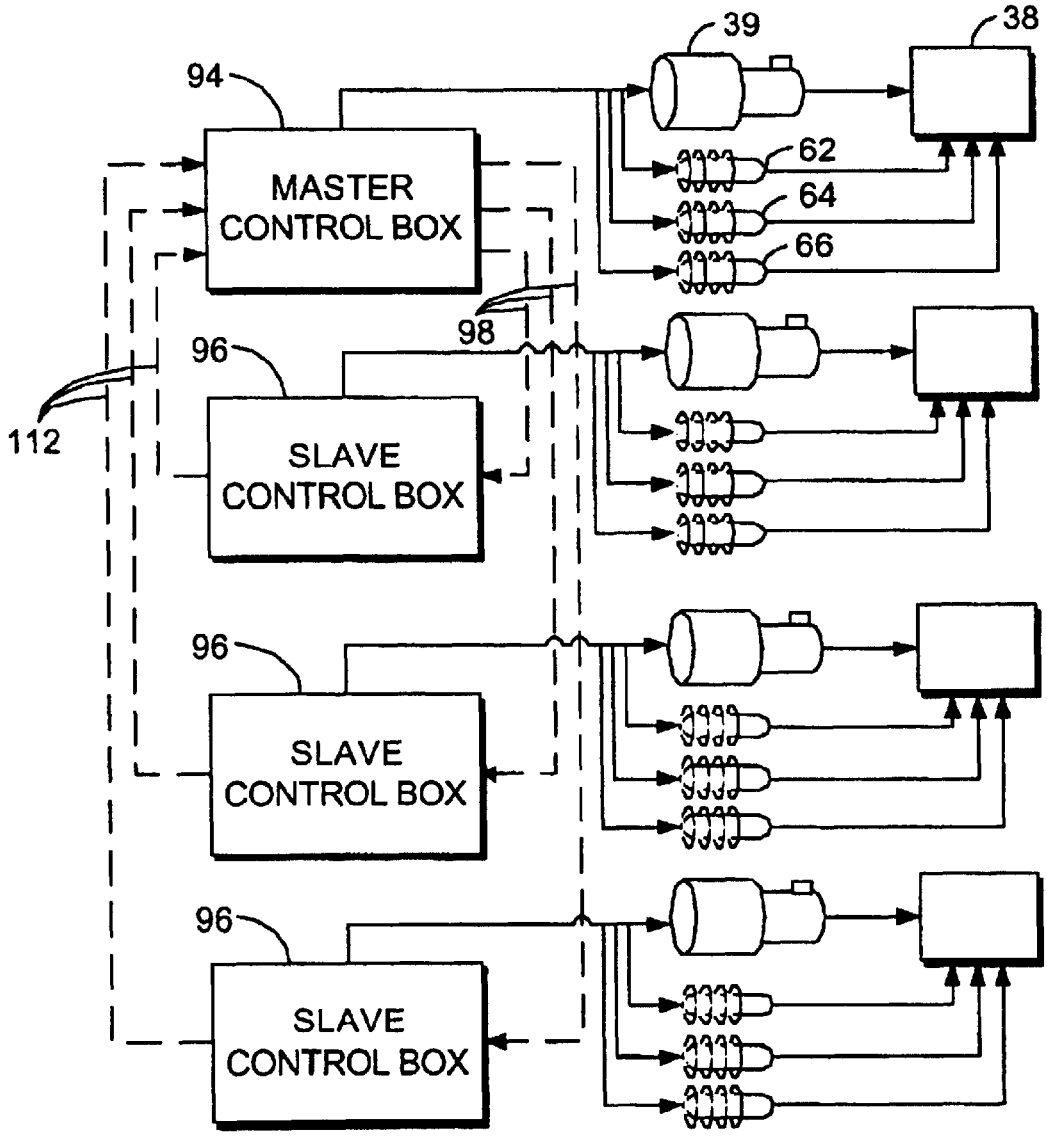
FIG. 5 is a schematic diagram illustrating the communications between a master control box, slave control boxes and associated output device, the wireless communications being shown in dashed lines.

As best seen in FIGS. 2 and 4, the lift system moves from step 90 to step 102, or from step 92 to step 102 if other lift mechanisms need to be set up. In step 102, each of control boxes wait for a command from its own box, remote control 58, or one of the other control boxes by wireless communication. Generally, if the command is sent from another control box, the second control box is designated as the master control box 94, and the receiving control boxes are designated as slave control boxes 96 as shown in FIG. 5. If none of the control boxes receive a command, then proceed to step 104 where master control box 94 may be established by selecting the interlock function on any one of the control boxes. If the interlock is not selected, then return to step 102 where each of the lift mechanisms wait for a command. If the interlock is selected, then the operator chooses to raise or lower the vehicle at the master control box 94 as shown in step 105. With additional reference to FIG. 5, master control box 94 proceeds to command slave control boxes 96 to raise or lower by one or more wireless signals 98 at step 118 by motion switch 56, and waits for a response from each of the slave control boxes 96 at step 106. Once the wireless signals are sent by the master control box at step 118, slave control boxes 96 wait to receive a command at step 102. If one or more of slave controls do not receive the wireless signal from master control box, then remains at step 102.

However, if slave control boxes 96 receive wireless signal 98 from master control box 94, then slave control boxes 96 must determine whether to raise, lower or hold the vehicle at step 107. As best seen in FIGS. 4 and 5, if the wireless signal 98 provides an instruction to raise vehicle 14, master control box 94 and each of slave control boxes 96 activate power unit 39 which turns the pump on at step 108 to cause piston and cylinder assembly 38 to move the vehicle in an upward direction. If the wireless signal 98 provides an instruction to lower the vehicle 14, master control box 94 and each of slave control boxes 96 activate lowering valve solenoid 62, holding valve solenoid 64 and safety release solenoid 66 to cause piston and cylinder assembly 38 to move the vehicle downwardly which is shown by step 110. The pump and lowering valve solenoid 62 are preferably activated in intervals when the lift mechanisms are raising and lowering the vehicle from the surface respectively. However, it will be understood and appreciated that the intervals may be such a short duration that the lift mechanisms operate to smoothly raise or lower the vehicle relative to the surface. The operation of the pump and lowering valve solenoid 62 may also be conducted in a continuous manner without any intervals.

Notwithstanding whether vehicle is being raised or lowered as described in steps 108 and 110, height sensing mechanisms 48 on each lift vehicle 12 determines the new height of the carriage relative to the surface, conveys that information to their respective control boxes 94, 96, provides the height on display 68 and waits for another command as illustrated in FIGS. 2,4 and 5. Slave control boxes 96 then send the height information by one or more wireless signals 112 to master control box 94 to create a feedback loop. It will be understood and appreciated that any of the wireless signals sent or received in lift system 10 may be accomplished through the use of a transceiver device. At step 114, the master control box 94 compares its own height measurement with the height measurements sent by slave control boxes 96 during the lifting or lowering of the vehicle and determines if an adjustment is needed at step 116. If the heights of each of slave control boxes 96 are within a predetermined tolerance range, master control box 94 sends a signal to all of the lift mechanisms continue to lift or lower the vehicle at step 118. Once vehicle 14 has reaches a desired height, the lift system may then proceed from step 118 and return to step 102 where slave control boxes 96 wait for a further command. Alternatively, if master control box 94 receives a wireless signal 112 that indicates that one or more of the other lift mechanisms are not at the proper height and an adjustment is need, master control box 94 will determine what rate of speed the lift mechanisms must operate to perform a coordinated lift of vehicle 14 and instructs the slow mechanisms to catch up in step 120 by one or more wireless signals 122 and returns to step 102.

In order to provide for a safe working environment for a user, lift system 10 includes safety features to prevent the inadvertent movement of vehicle 14. Specifically, lift system 10 may provide for security features need to prohibit false signals from interfering with the communication between the control boxes. For instance, each control box may have a unique identifier associated therewith, where each wireless communication sent by that control box includes its unique identifier. The unique identifier may be in the form of a serial number. The receiving control boxes would only react to a command from another control box if it recognizes that control boxes serial number. This type of security feature would prevent outside interference from moving the lift mechanism inadvertently. In addition, lift system 10 may also utilize other types of safety features. Specifically, as best seen on FIGS. 2 and 5, safety release solenoid 66 may activate a independent mechanical latch during the lowering command that normally prevents the carriages on the lift mechanisms from falling to the surface upon a failure of piston and cylinder assembly 38. Furthermore, emergency stop button 50 may also be activated at any point from any lift mechanism during the raising or lowering of vehicle 14 to stop further movement of carriage 32 relative to post 18.

It can, therefore, be seen that the invention is one that is designed to overcome the drawbacks and deficiencies existing in the prior art. The invention provides a lift system that includes a plurality of lifting mechanisms that communicate with each other using wireless signals to raise or lower a vehicle in a coordinated fashion. The use of wireless communication between the lifting mechanisms allows for a coordinated lift while preventing the possibility of injury from tripping over wires that typically extend across the working area in prior art systems. The lift system also provides for increased mobility and convenience due to the rechargeable power source that is used to raise and lower the vehicle from the surface.

While particular embodiments of the invention have been shown, it will be understood, of course, that the invention is not limited thereto, since modifications may be made by those skilled in the art, particularly in light of the foregoing teachings. Reasonable variation and modification are possible within the scope of the foregoing disclosure of the invention without departing from the spirit of the invention.

What is claimed is:

[1. A lifting device for moving a vehicle relative to a surface, said lifting device comprising:

at least two posts;

a carriage slidably coupled to each of said posts, each of said carriages being adapted to support a portion of the vehicle;

an actuating device coupled with each of said carriages, each of said actuating devices being capable of moving said carriage relative to said post; and a control device coupled with each of said actuating devices, each of said control devices capable of communicating by wireless signals with the other control device;

wherein each of said carriages supports a portion of the vehicle, and wherein each of said control devices communicate with each other by wireless signals to coordinate the movement of said carriages relative to said posts to raise or lower the vehicle relative to the surface.]

[2. The device of claim 1, wherein said control device includes a transceiver that transmits and receives wireless signals from another control device.]

[3. The device of claim 1, further comprising a sensor coupled with said control device for determining the position of said carriage on said post.]

[4. The device of claim 1, wherein said control device includes a stop mechanism that prevents the movement of said carriage relative to said post.]

[5. The device of claim 4, wherein said control device is adapted to prevent the movement of one or more of the other carriages relative to each of their posts by wireless signals.]

[6. The device of claim 1, wherein said actuating device is a piston and cylinder assembly.]

[7. The device of claim 6, wherein said piston and cylinder assembly is operated by hydraulic force.]

[8. The device of claim 6, wherein said piston and cylinder assembly is operated by pneumatic force.]

[9. The device of claim 1, further including a power source that provides power to said actuating device to move the vehicle relative to the surface.]

[10. The device of claim 9, wherein said power source is a rechargeable battery.]

[11. The device of claim 1, further including a separate power source for each of said actuating devices that provides power to said actuating device to move the vehicle relative to the surface.]

[12. The device of claim 1, further comprising a remote control capable of communicating with said control box using wireless signals to raise or lower the vehicle relative to the surface.]

[13. The device of claim 1, wherein said control device has a unique identifier associated therewith which may be transmitted with the wireless signal.]

[14. The device of claim 1, wherein said device is self-contained and portable.]

[15. The device of claim 1, wherein said carriages are capable of operating independently of one another.]

16. A lift system for raising and/or lowering a vehicle relative to a surface, said lift system including at least two lift mechanisms, each of said lift mechanisms comprising:

a post *upstanding from a base*;

a carriage slidably [coupled] *engaged* with said post, said carriage being adapted to support the vehicle;

an actuating device *engaged between said post and said carriage and* capable of moving said carriage relative to said post; [and]

a control device coupled with said actuating device[, said control device capable of communicating by wireless signals with another control device];

*a height sensor engaged between said post and said carriage and communicating a height measurement of said carriage relative to said post to said control device; and*

*a wireless transceiver coupled with said control device and operable to transmit a wireless signal to a corresponding transceiver of the control device of the other of said lift mechanisms and to receive a wireless signal therefrom;* wherein said carriage supports a portion of the vehicle, and wherein [said] *the* control device [communicate] *of one of said lift mechanisms communicates* with the [other] control [devices] *device of the other lift mechanism* by wireless signals *including height measurements* to coordinate the movement of said carriages relative to said posts to raise or lower the vehicle relative to the surface.

[17. The system of claim 16, wherein said control device includes a transceiver that transmits and receives wireless signals from another control device.]

[18. The system of claim 16, further comprising a sensor coupled with said control device for determining the position of said carriage on said post.]

19. The system of claim 16, wherein said control device includes [a] *an emergency* stop mechanism [that prevents] *selectively operable to prevent* movement of [said] *each* carriage relative to [said] *its associated* post.

[20. The system of claim 19, wherein said control device is adapted to prevent the movement of one or more of the other carriages relative to each of their posts by wireless signals.]

21. The system of claim 16, wherein said actuating device includes a piston and cylinder assembly.

22. The system of claim 21, wherein said piston and cylinder assembly is operated by hydraulic force.

23. The system of claim 21, wherein said piston and cylinder assembly is operated by pneumatic force.

24. The system of claim 16, [further comprising] *wherein each lift mechanism includes* a power source that provides power to said actuating device to raise and/or lower the vehicle relative to the surface.

25. The system of claim 24, wherein said power source is a rechargeable battery.

[26. The system of claim 16, further including a separate power source for each of said actuating devices that provides power to said actuating device to raise and/or lower the vehicle relative to the surface.]

27. The system of claim 16, further comprising a remote control capable of communicating by wireless signals with [said] *each* control [box] *device* to raise and/or lower the vehicle relative to the surface in a coordinated fashion.

28. The system of claim 16, wherein [said] *each* control device has a unique identifier associated therewith which may be transmitted with the wireless signal.

[29. The system of claim 16, wherein said lift mechanisms are self-contained and portable.]

30. The system of claim 16, wherein [each of] said lift mechanisms are capable of operating independently of one another.

[31. A lifting device for moving a vehicle relative to a surface, said lifting device comprising:

at least two posts;

support means slidably coupled to each of said posts, said support means being adapted to support a portion of the vehicle;

lifting means associated with each of said support means for moving said support means relative to said posts; and control means associated with each of said lifting means, said control means capable of communicating by wireless signals with the other control means, wherein each of said support means supports a portion of the vehicle, and wherein each of said control means communicate with each other by wireless signals to coordinate the movement of said support means relative to said posts to raise or lower the vehicle relative to the surface.]

[32. The device of claim 31, wherein said control means includes transceiver means for sending and receiving wireless signals to communicate with the other control means.]

[33. The device of claim 31, wherein said control means includes sensor means for determining the position of said support means relative to said post.]

[34. The device of claim 31, wherein said control means includes stopping means for preventing movement of said support means relative to said post.]

[35. The device of claim 34, wherein said control means is adapted to prevent the movement of one or more of the other support means relative to each of their posts by wireless signals.]

[36. The device of claim 31, further comprising a remote control means for communicating by wireless signals with said control means to raise or lower the vehicle relative to the surface.]

[37. The device of claim 31, further comprising a rechargeable power source means for powering said control means to move the vehicle relative to the surface.]

[38. The device of claim 31, wherein said lifting means moves said support means relative to said post by pneumatic force.]

[39. The device of claim 31, where said lifting means moves said support means relative to said post by hydraulic force.]

[40. The device of claim 31, further including a separate power source means for each of said actuating devices for powering said control means to move the vehicle relative to the surface.]

[41. The device of claim 31, wherein said device is self-contained and portable.]

[42. The device of claim 31, wherein said support means being capable of operating independent of one another.]

[43. A method for the coordinated movement of a vehicle relative to a surface, said method comprising:

providing first and second lift mechanisms;

placing first and second lift mechanisms in contact with a portion of the vehicle;

sending a wireless signal from said first lift mechanism;

receiving the wireless signal at said second lift mechanism, wherein said wireless signal instructs said second lift mechanism to move the vehicle relative to the surface; and moving the vehicle using said first lift mechanism in coordination with said second lift mechanism.]

44. The method of claim [43] *46*, wherein said first lift mechanism includes a master control box, and said second lift mechanism includes a slave control box, wherein said master control box and said slave control box communicate by said wireless signals.

[45. The method of claim 43, further comprising:

providing height sensors on first and second lift mechanisms; and determining the height of the vehicle relative to the surface at said first and second lift mechanisms.]

46. [The method of claim 45, further comprising] *A method for the coordinated movement of a vehicle relative to a surface, said method comprising the steps of*:

*providing first and second lift mechanisms;*

*placing said first and second lift mechanisms in contact with a portion of the vehicle;*

*sending and receiving wireless signals between said lift mechanisms;*

*moving the vehicle using said first lift mechanism in coordination with said second lift mechanism by means of said wireless signals sent and received between said lift mechanisms;*

*providing height sensors on said first and second lift mechanisms;*

*determining the height of the vehicle relative to the surface at said first and second lift mechanisms;* sending the height of the vehicle at said second lift mechanism to said first lift mechanism by a wireless communication;

comparing the height of the vehicle at the second lift mechanism with the height of the vehicle at the first lift mechanism; and adjusting the movement of the vehicle so that said first lift mechanism moves the vehicle in coordination with said second lift mechanism.

47. The method of claim [43] *46*, wherein first and second lift mechanisms move the vehicle using a rechargeable power source.

48. The method of claim [43] *46*, wherein said first and second lift mechanisms move the vehicle using separate power sources.

49. The method of claim [43] *46*, further comprising operating said first and second lift mechanisms independent of one another.

* * * * *